United States Patent [19]

Heuer et al.

[11] 4,130,868

[45] Dec. 19, 1978

[54] INDEPENDENTLY CONTROLLABLE MULTIPLE ADDRESS REGISTERS FOR A DATA PROCESSOR

[75] Inventors: Dale A. Heuer; Charles W. McCallister, both of Stewartville; Phillip C. Schloss, Rochester, all of Minn.

[73] Assignee: International Business Machines Corporation, Armonk, N.Y.

[21] Appl. No.: 786,921

[22] Filed: Apr. 12, 1977

[51] Int. Cl.² .................................................. G06F 9/20
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,676,851 | 7/1972 | Eastman | 364/200 |
| 3,680,055 | 7/1972 | Wilson | 364/200 |
| 3,688,263 | 8/1972 | Balogh, Jr. et al. | 364/200 |
| 3,886,525 | 5/1975 | Brown et al. | 364/200 |
| 3,940,745 | 2/1976 | Sajeva | 364/200 |
| 3,942,156 | 3/1976 | Mock et al. | 364/200 |
| 3,947,821 | 3/1976 | Dalmasso | 364/200 |
| 3,973,243 | 8/1976 | Whiteside et al. | 364/200 |
| 3,975,714 | 8/1976 | Weber et al. | 364/200 |
| 4,010,451 | 3/1977 | Kibble et al. | 364/200 |
| 4,032,898 | 6/1977 | Grigoletti | 364/200 |

*Primary Examiner*—Melvin B. Chapnick
*Attorney, Agent, or Firm*—J. Michael Anglin

[57] ABSTRACT

A microprocessor has a common data bus coupled to a storage data register, two separate storage address registers and a storage control unit. The data register transfers data to and from a storage unit addressed by that address register selected by a gating means. The address registers can be independently incremented and decremented, and perform either a read or a write operation. All these functions are specified by signals produced from a control word held in the storage control unit.

4 Claims, 3 Drawing Figures

INDEPENDENTLY CONTROLLABLE MULTIPLE ADDRESS REGISTERS FOR A DATA PROCESSOR

BACKGROUND OF THE INVENTION

The present invention relates to digital data processors, and, more particularly concerns improved means for storage addressing.

Physically small microprocessors are increasingly called upon to provide programmable functions (sometimes called "intelligence") within data processing terminal equipment, and within other electronic equipment as well. Processors for such functions should not be thought of as merely scaled-down and slower versions of traditional computers; in some respects, microprocessors should even surpass their older brothers in speed and capability. One area of this kind pertains to transferring blocks of data words to and from a storage unit. Many current and future uses of microprocessors require both versatility and efficiency in operations such as moving multiple adjacent words in storage from, say, an input buffer to an output buffer, and such as performing arithmetic or logic operations upon corresponding data words of blocks in different storage areas. Although previous processor configurations have recognized these factors, solutions have been piecemeal and directed toward specific ad hoc problem areas, with little concern for a unified approach.

THE INVENTION

The present invention proposes to attack the microprocessor storage-addressing problem in a coherent manner, which provides both versatility and efficiency in performing the kinds of addressing which these processors are frequently called upon to do. Moreover, because the approach is a coherent one, the apparatus involved is simple and inexpensive from an implementation standpoint as well.

First, consider a microprocessor having an internal data bus interconnecting a number of registers and other functional units. Control signals coordinate transfers along this data bus under the overall control of timing and instruction-decoder circuits. In the instruction set of the decoder is a "memory control instruction" (MCI), which has the overall effect of transferring one or more data words between an addressable storage unit and a storage data register (SDR) coupled to the microprocessor data bus, in either or both directions, and, furthermore, modifying (e.g., incrementing and/or decrementing) one or more of the storage address registers (SAR's) used in the transfer. All of these operations are specified by a control word stored in a storage control unit. This unit, like the SDR and SAR's, is connected to the microprocessor data bus, and, thus may be loaded and read in the same manner as any other register. The generality of the control word, and the mutual independence of the operations it may specify, open new paths in the uses which microprocessors may serve.

Other objects and advantages of the present invention, as well as other features and modifications within the spirit of the invention and apparent to those skilled in the art, may be found in the following description of a preferred embodiment.

DRAWINGS

DETAILED DESCRIPTION

Figure 1:
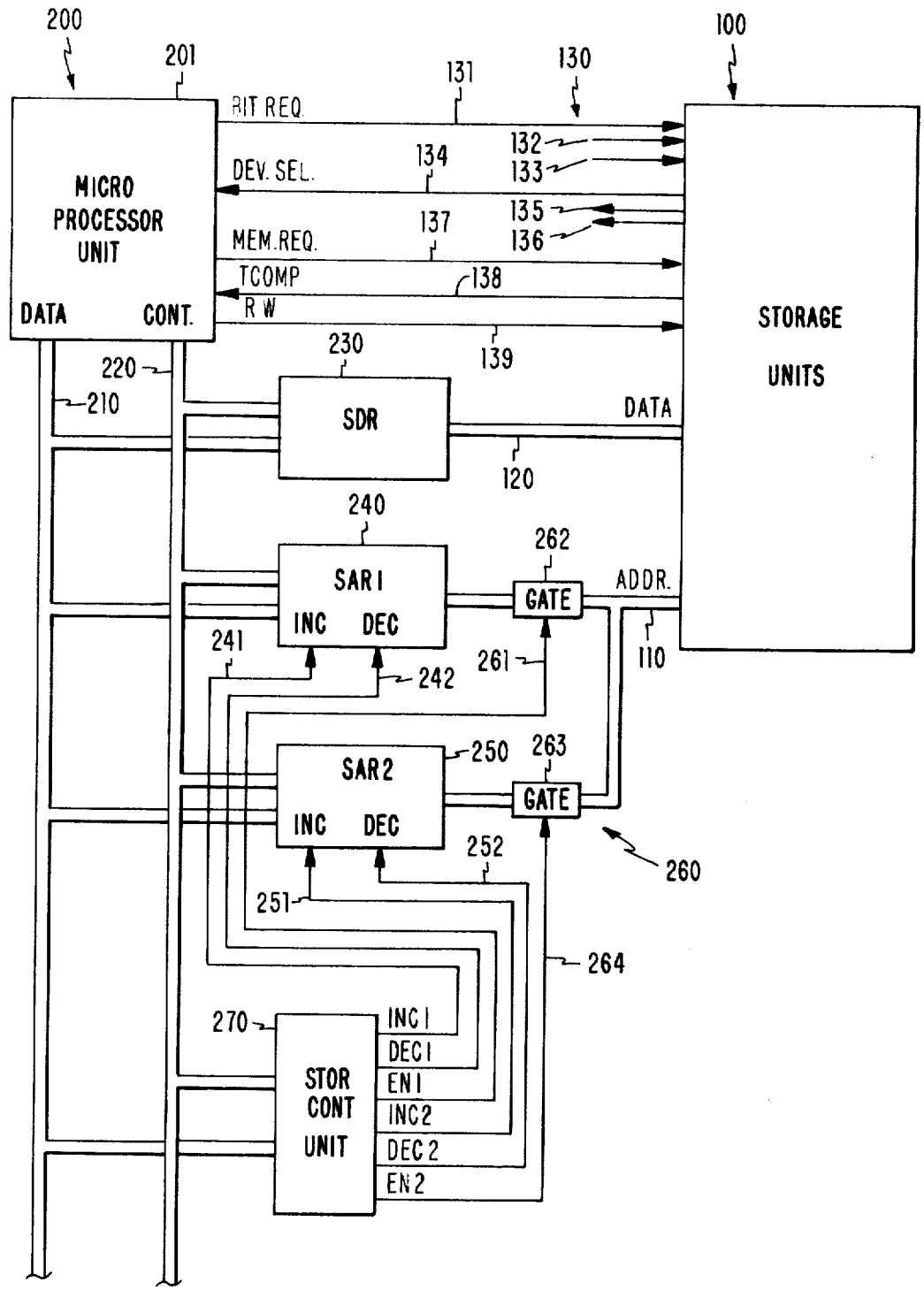
FIG. 1 is a block diagram of a digital data processor configured according to the present invention.

FIG. 1 shows a digital data processor structured around a common internal data bus coupled to various registers and other functional units. The overall structure of this processor is shown in more detail in the commonly assigned Application entitled, "Interval Timer", by B. G. Fossum, et al, filed on Apr. 12, 1977, Ser. No. 786,918, and incorporated herein by reference.

For purposes of the present discussion, the processor may be divided, first of all, into one or more storage units 100 and a microprocessor 200. As in conventional practice, storage 100 has many addressable locations which are individually accessed by signals on an address bus 110. Data are then transferred to or from the addressed location over storage data bus 120. Storage control bus 130 synchronizes and controls the operation of storage 100 and microprocessor 200. Briefly, every storage operation begins with a "bit request", BITREQ, line 131, which signals storage 100 that microprocessor 200 is requesting a cycle. (Request lines 132 and 133 perform the same function for functional units, not shown, which may be connected to the same storage 100.) Storage unit 100 responds with a "device select" signal, DEVSEL, line 134. (Lines 135 and 136 select the other units alluded to earlier.) Having been selected for a storage operation, "memory request" signal, MEMREQ, line 137, initiates a storage cycle; when this cycle is finished, "time complete" signal, TCOMP, line 138, so informs microprocessor 200. "Read/write" signal, RW, line 139, specifies the direction of the data flow on bus 120 for the cycle initiated by MEMREQ.

Microprocessor 200 is generally organized around a common internal data bus 210 interconnecting a number of selectable registers and other functional units, each of which transfers data to or from bus 210 in response to signals on a control bus 220. The registers pertinent to the present invention are shown separately in FIG. 1, while the remaining entities are lumped together in block 201. This block may include, for example, conventional timing circuits, an arithmetic-logic unit (ALU) and so forth. Block 201 also includes a conventional instruction decoder which produces command signals for evoking the execution of different instructions in a predefined instruction set. The individual lines 131, 134 and 137-139 in storage control bus 130 also appear in microprocessor control bus 220.

One of the selectable registers of microprocessor 200 is storage data register (SDR) 230. Signals on bus 220 may cause this register to transfer its contents to or from internal bus 210. In addition, other control signals, including RW signal 139, cause data transfers to and from storage unit 100 over bus 120. SDR 230, then, is the only interface between internal data bus 210 and storage data bus 120.

Storage address registers (SAR1, SAR2) 240 and 250 are coupled in the same way to busses 210 and 220. That is, signals on bus 220 may select either register to transfer its contents to bus 210 or to load data from bus 210. These registers are actually built from conventional up/down counter circuits. Thus, in addition to transferring data in and out, control signals applied to inputs 241 and 251 will increment the content of registers 240 and 250 respectively. Similarly, signals at inputs 242 and 252 will decrement these registers. The increment and decrement functions may be done externally to registers 240 and 250 if desired; it happens to be more convenient in this embodiment to perform them in situ. The signals INC1, DEC1 and INC2, DEC2 may be considered as address-modification signals in a general sense. For example, a single line could specify whether to increment or decrement, or additional signal lines (not shown) could specify other operations, such as addition or subtraction, on the register contents.

registers 230 and 240 are also coupled to storage 100 via gating means 260. When enable input 261 is activated, conventional gate 262 places the contents of SAR1 240 on storage address bus 110; enable input 264 similarly couples SAR2 250 to bus 110 via gate 263.

Storage control unit 270 produces the pertinent signals for controlling the precessor operations involving storage 100. Basically, it responds to control signals indicating particular commands and the current state of storage 100, to produce appropriately timed signals to registers 240 and 250, gating means 260 and storage 100.

Figure 2:
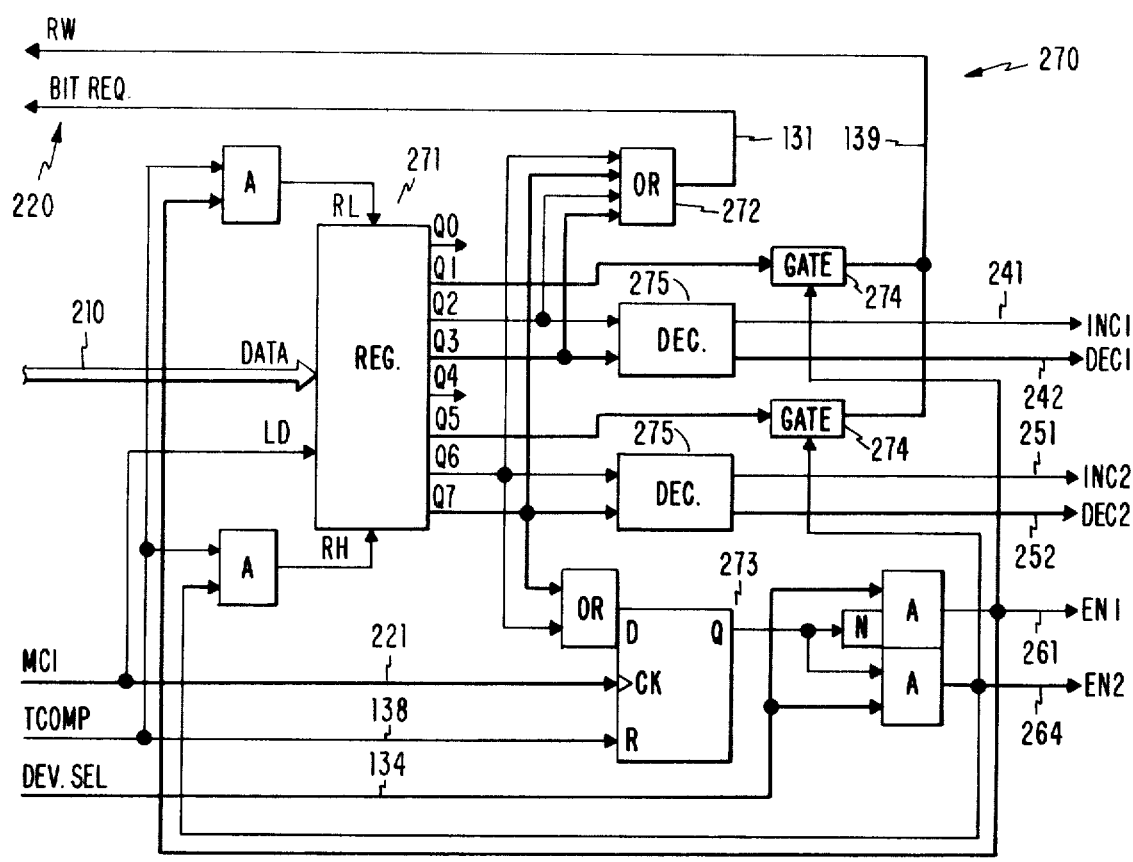
FIG. 2 shows the details of the storage control unit of FIG. 1.

FIG. 2 shows storage-control unit 270 in greater detail. This unit recieves a signal on line 221 of control bus 220, which causes an eight-bit control word from internal data bus 210 to be loaded into register 271 via a conventional "load" (LD) input. This register may be conceptualized as two four-bit registers Q0-Q3 and Q4-Q7, one for each of SAR's 240 and 250 of FIG. 1. AND gates coupled to reset-low (RL) and reset-high (RH) inputs can reset Q0-Q3 and Q4-Q7 to zero separately. The individual bit meanings are, broadly, as follows:

Q0 - Not used.
Q1 - Read from (0) or write to (1) the storage location addressed by SAR1.
Q2 - Increment SAR1.
Q3 - Decrement SAR1.
Q4 - Not used.
Q5 - Read from (0) or write to (1) the storage location addressed by SAR2.
Q6 - Increment SAR2.
Q7 - Decrement SAR2.

Figure 3:
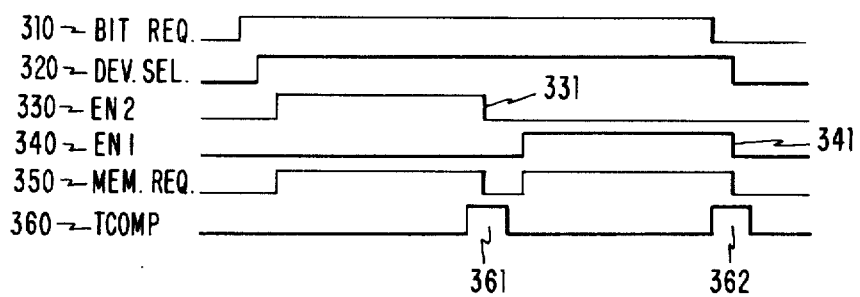
FIG. 3 is a timing diagram for explaining the operation of the data processor.

It will be noted that the combinations 00 and 11 of Q2 and Q3 would both leave the contents of SAR1 240 undisturbed. These two cases are interpreted separately, in that 00 means that SAR1 is not to be used at all, while 11 signifies that SAR1 is used to address storage, but its contents are neither incremented nor decremented, and similarly for Q6 and Q7, with respect to SAR2. More specifically, request-logic OR gate 272 activates BITREQ, line 131, whenever the current control word indicates that either SAR1 or SAR2 needs a storage cycle. Waveform 310, FIG. 3, shows this signal. If SAR2 has requested a cycle, the OR gate of enable logic 273 causes a D-type (polarity-hold) latch to set upon the leading edge of MCI 221 at its clock input. This causes the lower AND gate of logic 273 to raise EN2 signal 264 after storage 100 returns DEVSEL, line 134, as shown by waveforms 320 and 330, FIG. 3. Logic within block 201, FIG. 1, then generates MEMREQ, as shown at 350, FIG. 3. (MEMREQ may be thought of as merely the OR of EN1 261 and EN2 264.)

The EN2 signal 264 also causes gating logic 274 to couple Q5 to RW line 139, so that the SAR2 address may be used either to read (RW = 0) or to write (RW = 1) a data byte.

As soon as storage 100 has completed this cycle, TCOMP 138, shown at 360, FIG. 3, asynchronously resets the latch in enable logic 273, and resets Q4-Q7 via the lower AND gate associated with register 271. Conventional decode logic 275 raises increment signal by pulse 361 INC1 241 if Q2 is up but Q3 is down; DEC1 is raised for the reverse situation. Similarly, INC2 251 is active for Q6 on, but Q7 off, and DEC2 252 for Q6 off and Q7 on. The actual incrementing or decrementing of SAR2 250 takes place at falling edge 331 of EN2.

Then, if either of the bits Q2 and Q3 is nonzero, SAR1 240 is requesting a storage cycle. Logic 273 now produces an EN1 signal 261, since the latch has been reset, so that inverter N can enable the upper AND. As shown at 320, DEVSEL is still raised, because OR 272 has not yet allowed BITREQ 131 to drop, assuming that either Q2 or Q3 is nonzero. EN1 261 thus gates SAR1 240 to storage address bus 110 via gate 262, FIG. 1. EN1 is shown at 340 in FIG. 3. Again, MEMREQ 350 initiates a storage cycle, and completion is signalled by TCOMP pulse 362. The lower decode block 275 has raised INC1 signal 241 for Q6 on, Q7 off, and has raised DEC2 242 for the reverse situation. These signals cause the contents of SAR1 to change at the falling edge 341 of EN1 waveform 340. The upper AND of register 271 resets Q0-Q3, since EN1 261 is set.

No further cycles occur during this MCI instruction, because all bits Q0-Q7 have been reset, thus disabling OR 272. Although a double-cycle instruction has been described, SAR1 240 may be used as an address by itself, if bits Q6 and Q7 are both zero, since the latch in 273 will never be set. SAR2 250 may also be used for a single-cycle storage operation; although EN1 261 will be set after the SAR2 cycle is finished, the zeros in bits Q2 and Q3 will cause BITREQ 131 to drop, since OR 272 is no longer enabled after Q4-Q7 are reset. Therefore, no second cycle will be initiated. The only disallowed combination is a double cycle in which SAR1 is used before SAR2. This particular sequence could easily be provided if found desirable in a particular application.

We claim as our invention:

1. In a digital date processor having an addressable storage unit including an address bus and having a number of registers coupled to a common bus for transfer of data to and from said common bus, said processor being capable of producing command signals evoking the execution of different instructions, the combination comprising:
  a storage control unit coupled to said common bus and responsive to one of said command signals for receiving a control word from said common bus, and for producing therefrom a plurality of control signals including first and second enable signals and mutually independent first and second address-modification signals;
  first and second address registers coupled to said common bus and capable of being independently incremented and decremented by said first and second address-modification signals, respectively; and
  gating means for selectively coupling said first and second address registers to said address bus of said addressable storage unit in response to said first and second enable signals, respectively.

2. The date processor of claim 1, wherein said control signals also include first and second mutually independent read/write signals, and wherein said storage control unit includes gating logic responsive to said first and second enable signals for selectively coupling said first and second read/write signals to said addressable storage unit.

3. The date processor of claim 2, wherein said address registers are counters whose contents are directly modifiable by said increment and decrement signals.

4. The data processor of claim 1, further comprising a storage data register coupled to said common bus and to said addressable storage unit, for transferring stored data therebetween.

* * * * *